United States Patent [19]

Berman

[11] Patent Number: 4,765,527
[45] Date of Patent: Aug. 23, 1988

[54] TUBESHEET AND A METHOD FOR EXPLOSIVELY WELDING A TUBE TO A TUBESHEET WHILE PREVENTING SEPARATION OF CLADDING FROM THE TUBESHEET

[75] Inventor: Irwin Berman, Montclair, N.J.

[73] Assignee: Foster Wheeler Development Corporation, Livingston, N.J.

[21] Appl. No.: 922,647

[22] Filed: Oct. 24, 1986

[51] Int. Cl.⁴ .......................................... B23K 20/08
[52] U.S. Cl. ............................. 228/107; 29/157.3 C; 29/157.4
[58] Field of Search ............... 228/107, 108, 109, 183, 228/2.5; 29/157.3 C, 157.4, 157.3 R

[56] References Cited

U.S. PATENT DOCUMENTS

| | | |
|---|---|---|
| 3,411,198 | 11/1968 | Berman et al. . |
| 3,411,687 | 11/1968 | Riley et al. .................. 228/107 X |
| 3,555,656 | 1/1971 | Brown et al. .................. 228/108 |
| 3,608,490 | 9/1971 | O'Keefe . |
| 3,717,925 | 2/1973 | Hardwick ..................... 228/183 X |
| 3,730,415 | 5/1973 | Richter . |
| 3,868,131 | 2/1975 | Zondag ....................... 228/107 X |
| 4,008,117 | 2/1977 | Dybwad . |
| 4,014,729 | 3/1977 | Dybwad . |
| 4,184,243 | 1/1980 | Schroeder et al. . |
| 4,333,597 | 6/1982 | Hardwick ..................... 228/183 X |
| 4,449,280 | 5/1984 | Schroeder .................. 29/157.3 C X |
| 4,485,960 | 12/1984 | Sagan et al. ....................... 228/107 |
| 4,494,392 | 1/1985 | Schroeder . |

Primary Examiner—Nicholas P. Godici
Assistant Examiner—Carmine Cuda
Attorney, Agent, or Firm—Marvin A. Naigur; Warren B. Kice

[57] ABSTRACT

A method for explosively welding a tube to a tubesheet having a cladding extending over an outer surface thereof. A layer of material is bonded over the cladding which absorbs the energy from the shock wave formed by the explosive welding, to prevent breaking up the bond between the cladding and the tubesheet.

1 Claim, 1 Drawing Sheet

TUBESHEET AND A METHOD FOR EXPLOSIVELY WELDING A TUBE TO A TUBESHEET WHILE PREVENTING SEPARATION OF CLADDING FROM THE TUBESHEET

BACKGROUND OF THE INVENTION

This invention relates to a tubesheet and a method for explosively welding a tube into said tubesheet and, more particularly, to such a tubesheet and method in which a cladding is bonded to a surface of the tubesheet and is prevented from being separated therefrom.

In order to secure a plurality of heat exchange tubes in corresponding bores formed in a tubesheet, several techniques have evolved. One of the most effective techniques is to explosively force each tube against the internal wall defining the corresponding bore in the tubesheet, which involves detonating an explosive placed within the tube so that the resulting explosive forces acting on the tube expands it and forces the outer surface of the tube to the bore wall.

However, several problems exist in these types of techniques. For example, the tubesheet is often fabricated from a relatively inexpensive material, such as steel, for economic reasons and the outer surfaces of the tubesheet are often provided with a layer or cladding consisting of a relative thin layer of material which is resistant to the corrosive elements to which the tubesheet is exposed. However, the bond between steel and some cladding materials, such as titanium, aluminum and the like, are somewhat limited due to the differences in the molecular makeup between the respective materials.

SUMMARY OF THE INVENTION

It is therefore an object of the present invention to provide a method for explosively welding a tube to a tubesheet having a corrosive resistant cladding on its external surface.

It is a further object of the present invention to provide a method of the above type in which the bond between the cladding and the tubesheet is not broken during the explosive welding.

It is a further object of the present invention to provide a method of the above type in which a sacrificial layer is affixed to the cladding to prevent breaking of the bond between the cladding and the tubesheet.

It is a still further object of the present invention to provide a tubesheet which has a cladding bonded to an outer surface thereof, and a layer of additional material bonded to the outer surface of the cladding for absorbing the energy from the explosive welding of a tube in the tubesheet, so that the bond between the cladding and the tubesheet remains intact.

Toward the fulfillment of these and other objects the the present invention includes a method for explosively welding a tube to a tubesheet having a cladding extending over an outer surface thereof, in which an explosive is placed within the interior of said tube and a layer of material is bonded over said cladding. The layer is of a material which absorbs the energy from the shock wave formed by the explosion and prevents breaking up of the bond between the cladding and the tubesheet.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
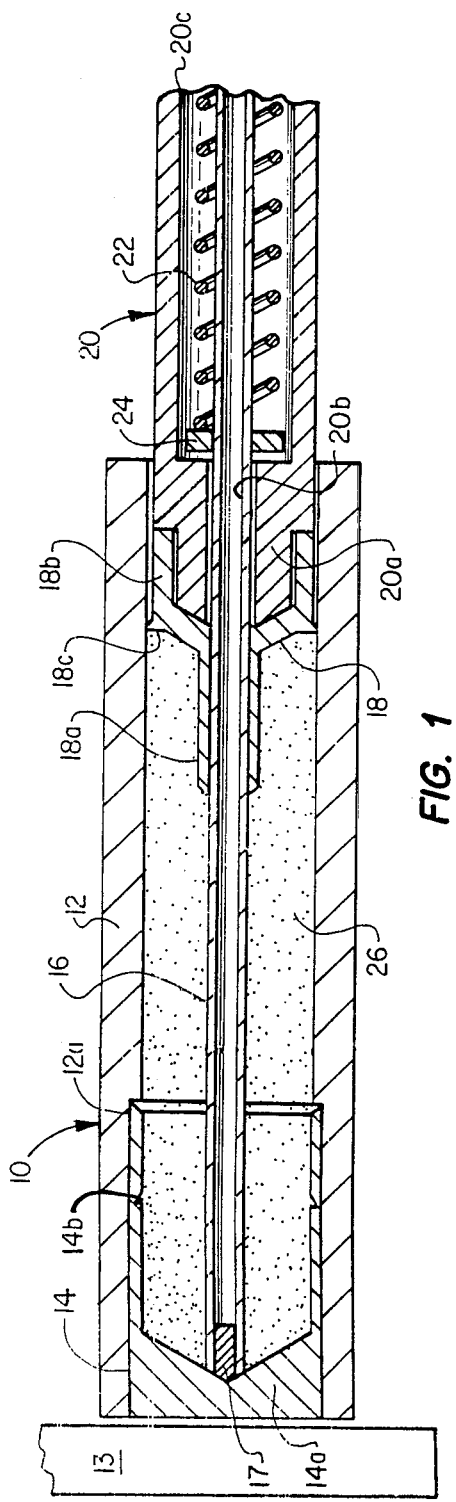
FIG. 1 is a cross-sectional view of two components utilized in performing the present invention.

Referring to FIG. 1 of the drawings, the reference numeral 10 refers, in general, to a fixture assembly consisting of a fixed tube 12 abutting against a stop member 13 and having a counterbore 12a formed at one end thereof. A cup member 14 extends within the counterbore 12a and has a base portion 14a abutting the stop member 13 and an annular groove 14b formed in its inner wall surface, for reasons that will be explained in detail.

An elongated hollow rod 16 has one end provided with a felt plug 17 which abuts against the center of the base portion 14a of the cup member 14. The rod 16 extends for the entire length of the tube 12 and the other end portion of the rod projects outwardly from the corresponding end of the tube.

A plug 18 is disposed within the tube 12 in a spaced relation to the cup member 14 and includes a tubular portion 18a and a base portion 18b. A land, or flange, 18c is formed on the outer surface of the base portion 18b which fits into the groove 14b of the cup 14, as will be described.

A piston 20 has a head portion 20a formed at one end and shaped similarly to the interior of the base portion 18b for fitting within said interior portion. The piston 20 has a bore 20b extending for its length for receiving the rod 16. A portion of the bore 20b is enlarged at 20c to accommodate a spring 22 which extends over the rod 16 and which abuts against a center rod collar 24 affixed to the rod.

Although the other end of the piston 20 is not shown, it is understood that it is operatively connected to an air cylinder (not shown) in a conventional manner for driving the piston, and therefore the plug 18, in a direction from right-to-left as viewed in FIG. 1.

The space within the tube 12 between the base 14a of the cup member 14 and the plug 18 contains a granular explosive 26, such as nitroquanidine, or the like.

When assembling the fixture assembly 10, the plug 18 is inserted in the tube 12 in the position shown in FIG. 1, and the rod 16 is inserted through the interior of the plug. A pre-weighed charge of the explosive 26 is then placed in the tube 12, and the cup member 14 is placed in the counterbore 12a with the explosive thus extending in a chamber defined by the tube, the cup member and the plug 18. The stop member 13 is then placed in abutment with the tube 12 and the cup member 14, and the piston 20 is then advanced, by its air cylinder, to the position shown in FIG. 1 with its head portion 20a extending in the interior of the plug 18.

Figure 2:
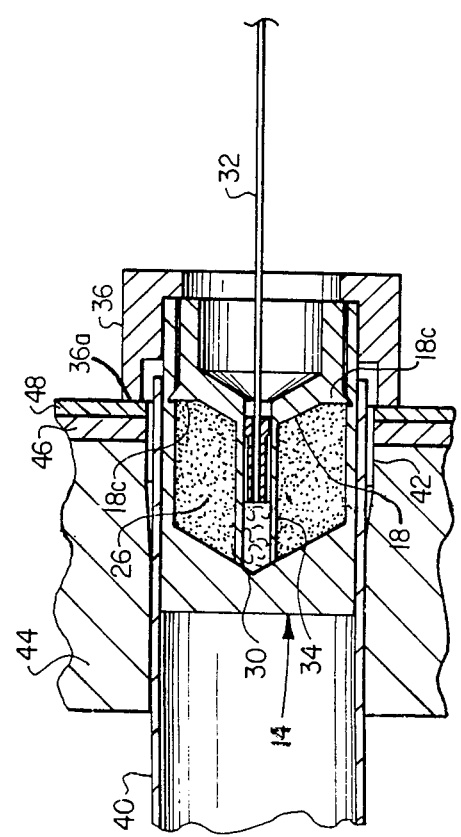
FIG. 2 is a cross-sectional view of the components of FIG. 1 in a fully assembled condition and inserted within a tube to be welded to a tubesheet.

The air cylinder is then further actuated to drive the plug further in a direction from right-to-left as viewed in the drawings until the plug 18 is driven into the interior of the cup member 14 and the flange 18c extends into the groove 14b of the cup member, as shown in FIG. 2. During this latter movement the spring 22 acts against the collar 24 and holds the rod 16 in place, while the explosive 26 is compressed into the space defined between the interior of the cup member 14 and the corresponding exterior surfaces of the plug 18. It is noted that, during the above movement of the plug 18 into the interior of the cup member 14 the felt plug functions to prevent the passage of the explosive into the interior of the rod 16 but permits the passage of air to vent same. The piston 20 is then retracted, the rod 16 removed from the interior of the plug 18, and the plug 18 with the cup member 14 contained therein, is removed from the counterbore 12a.

A measured quantity of a second explosive material 30, such as plasticized PETN (pentaerythritoltetranitrate) is then inserted in the end of the tubular portion 18a of the plug 18, as shown in FIG. 2, and a detonating-cord 32, surrounded by a tubular retainer member 34, is inserted into the tubular portion 18a until they abut the second explosive material 30. The detonating-cord 32 extends outwardly from the assembly and is adapted to be connected to an externally located detonator (not shown), in a conventional manner.

A cap 36 is placed over the end of the cup member 14 and the assembly thus formed is inserted within a tube 40 which is to be welded against the internal wall forming a bore 42 of a tubesheet 44. A layer of cladding 46 is provided on the outer surface of the tubesheet 44 to protect same from the corrosive elements encountered during use of the tube 40, and a sacrificial layer 48 extends over the cladding for reasons to be described. The tubesheet 44 is fabricated from a relatively inexpensive material such as steel, the cladding 46 is fabricated from a corrosion-resistant material such as titanium or aluminum, and the layer 48 can be formed of lead, plexiglass, or the like. The assembly thus formed is accurately positioned relative to the tubesheet 44 by virtue of the end 36a of the cap abutting the corresponding surface of the layer 48.

The sensitivity of the explosive material 30 is greater than that of the explosive 26 so that the detonating-cord 32, when ignited by the externally located detonator, functions to detonate the explosive 30 which, in turn, detonates the explosive 26. This sequential detonation eliminates the need for providing a detonating-cord with a relatively large charge and thus minimizes damage to the various components of the assembly 10.

Figure 3:
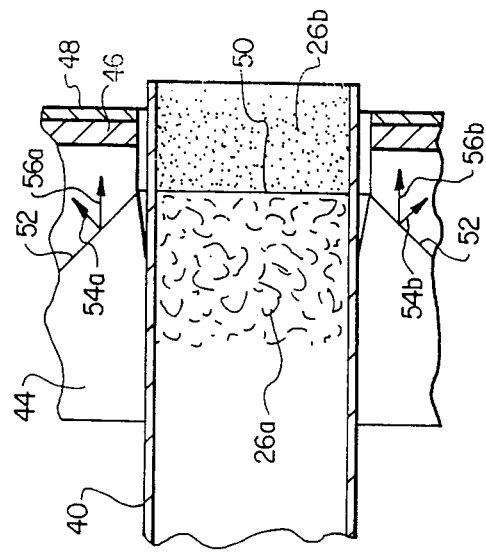
FIG. 3 is a view similar to FIG. 2, but depicting the assembly after detonation of the explosive and with the components within the interior of the tube being omitted for the convenience of presentation.

FIG. 3 is a view similar to FIG. 2 but with the cup member 14, the plug 18, and the associated components removed from the interior of the tube 40 and the section lines removed from the tubesheet 44 for the convenience of presentation. FIG. 3 depicts the tubesheet 44 and the tube 40 immediately after detonation of the explosive 26 with the line 50 showing the interface between the exploded portion 26a and the the unexploded portion 26b of the explosive 26.

The line 52, which extends around the tube 40, depicts the approximate location of the resultant compressive shock wave in the tubesheet 44, with the arrows 54a and 54b depicting the approximate direction of movement of same. That portion of the tubesheet extending immediately over the explosive 26 and to the left of the shock wave 52, as viewed in FIG. 3, is compressed while that portion of the tubesheet 44 extending to the right of the shock wave 52 remains uncompressed. Since the explosive products impart directly on the touching metal surfaces of the tubesheet 44 sequentially, the shock wave 52 is at an angle to the direction of movement of same as shown.

The arrows 56a and 56b depict the horizontal vectors of the compressive shock wave which travel in the direction of the cladding 46. As the unexploded portion of the 26b of the explosive 26 sequentially explodes in a direction from left-to-right as viewed in FIG. 3, the shock wave 52 approaches the cladding 46 and a greater portion of the tubesheet 44 becomes compressed. The shock wave 52 then passes through the cladding 46 and the layer 48 and the energy of the shock wave is absorbed by the latter layer. This causes the layer 48 to separate from the cladding 46 with the latter remaining bonded to the tubesheet 44.

The layer 48 thus serves as a sacrificial layer, and as such, removes the directed energy from the interface between the cladding 46 and the tubesheet 44 by reducing, if not eliminating, any reflected tensile shock wave moving in an axial direction from right-to-left away from the cladding 46. Thus the reflected shock wave 52 does not reach the interface between the cladding and the tubesheet 44 and cause separation of same.

Thus the tubesheet 44 can be fabricated from a relative inexpensive material, such as steel, which would be susceptible to corrosion, and can have a cladding bonded to its surface to prevent corrosion, and the bond between the tubesheet and the cladding will remain intact.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention therein.

What is claimed is:

1. A method for explosively welding a tube to a tubesheet having a cladding extending over an outer surface thereof, comprising the steps of placing an explosive within the interior of said tube, bonding a layer of material over said cladding, and detonating said explosive to explode same and weld the tube to the tubesheet, said layer being of a material which absorbs the energy from the shock wave formed by the explosion of said explosive and prevents breaking up of the bond between the cladding and the tubesheet.

* * * * *